Aug. 2, 1938.  C. DE GANAHL  2,125,427
METHOD OF FORMING CORRUGATIONS
Filed March 25, 1937   2 Sheets-Sheet 2
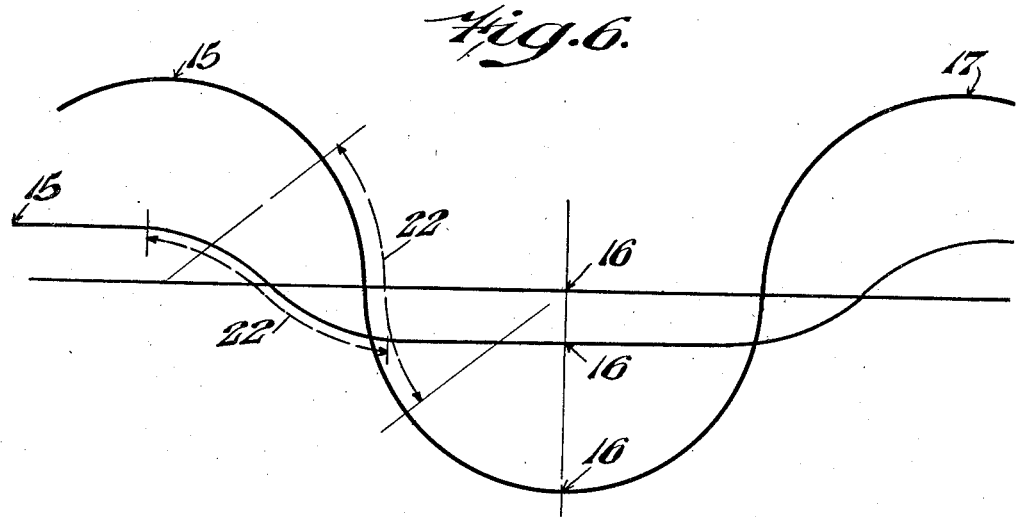
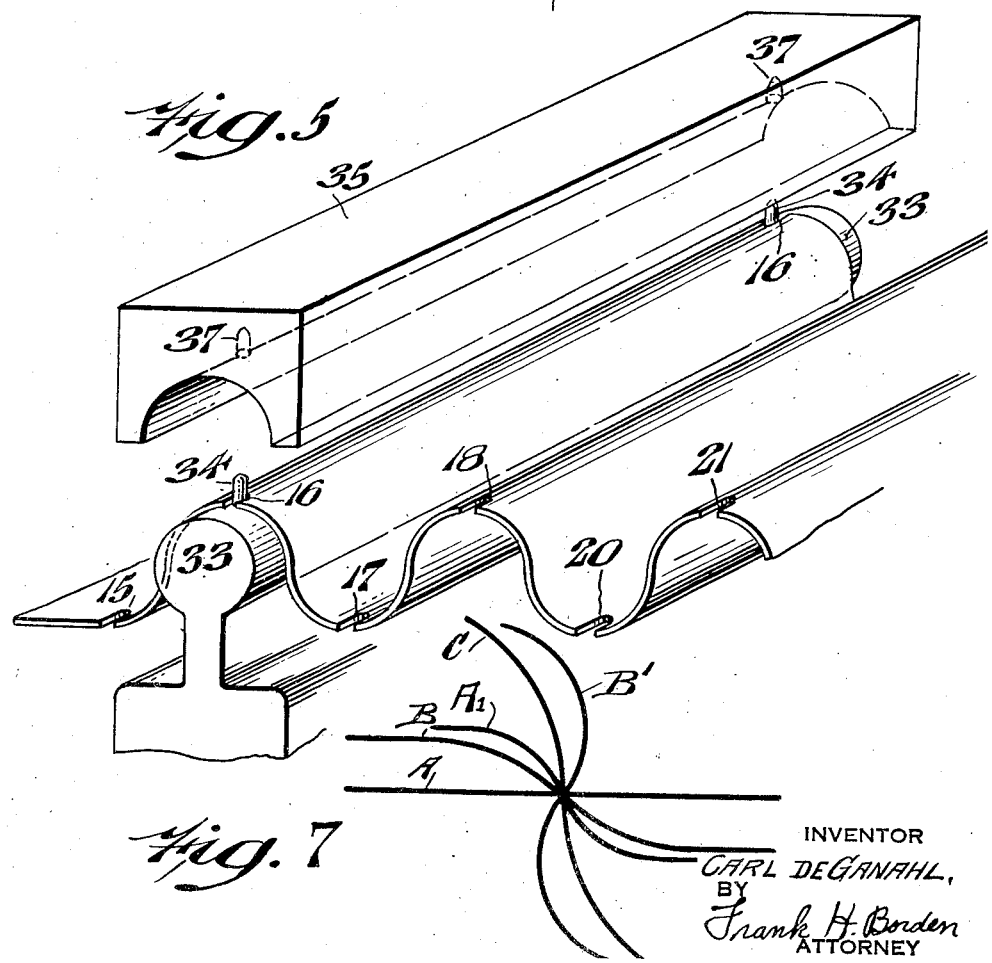
INVENTOR
CARL DEGANAHL,
BY
Frank H. Borden
ATTORNEY Patented Aug. 2, 1938

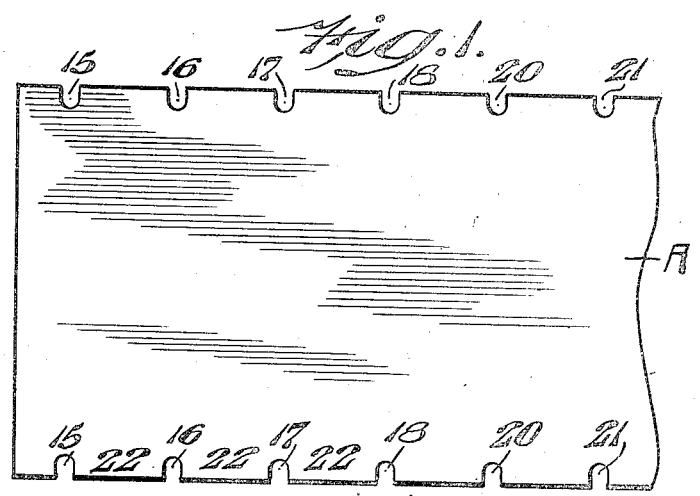
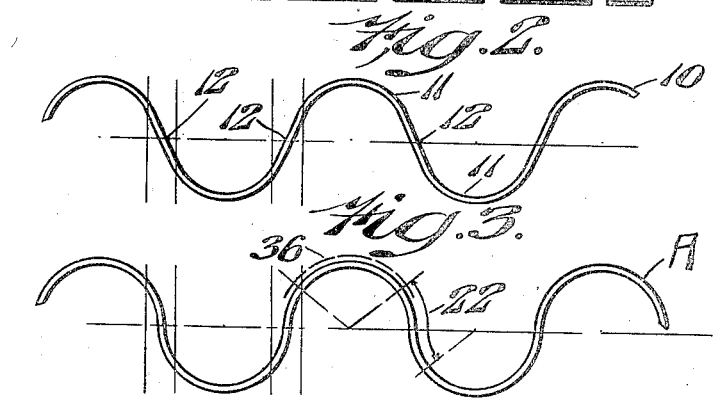
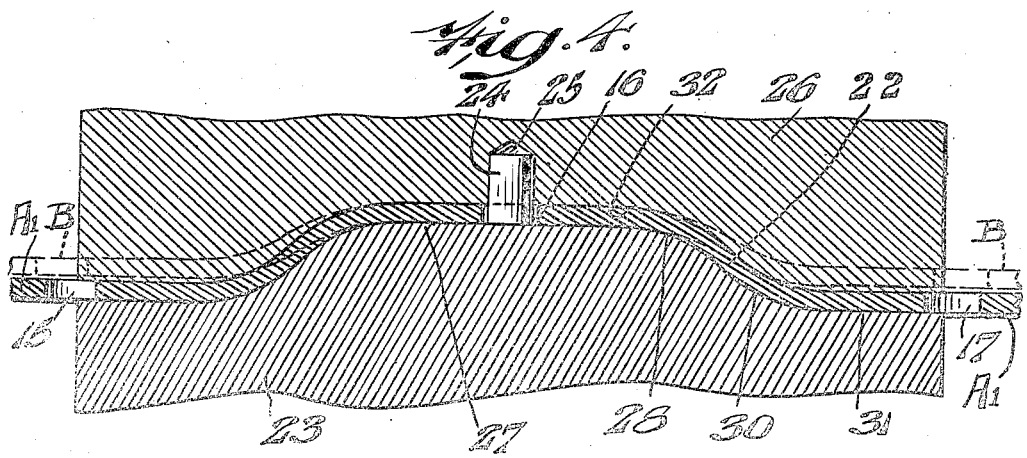

2,125,427

UNITED STATES PATENT OFFICE 2,125,427

METHOD OF FORMING CORRUGATIONS

Carl de Ganahl, Bristol, Pa., assignor to Fleetwings, Inc., Bristol, Pa., a corporation of Delaware Application March 25, 1937, Serial No. 132,916

7 Claims. (Cl. 153—76)

This invention relates to a method of forming uniform corrugations in hard resilient sheet metal and the product that results therefrom.

Sheet metal, such for instance as stainless steel, as used in aircraft and the like, is a hard resilient sheet requiring appreciable force for suitable working, and tending to resilient springing, or partial shape recovery, after distortion incident to a dieing or stamping operation. Stainless steel corrugated sheets for aircraft require extreme accuracy in formation, in order that overlapping sheets may substantially exactly register, without undue strain or stress. For many reasons such corrugated sheets are more desirable when the corrugations are not of true sinusoidal form but instead are formed of continuously curved mutually tangential intersecting arcuate corrugations. Owing to the toughness, hardness, and resilience of the steel sheets, it is found that forming the corrugations according to past practices is unsatisfactory and results in a generally sinusoidal corrugated sheet which is lacking in uniformity and strength. Specifically, a defect of the past constructions, among others, in which the corrugations were formed from the flat sheet by pressure upon what ultimately become apices of the corrugations, was that this formed partially cylindrical or arcuate curves extending in opposite directions of the sheet, connected, not by intersecting arcs of continuous curvature, but by substantially straight or flat side walls merging substantially tangentially into the partially cylindrical apices. This is because with the dieing pressure substantially normal to the flat sheet and substantially incapable of exerting any lateral pressure, no direct pressure is exerted to shape the side walls of the corrugations, which therefore retain the substantially flat formation of the original sheet.

It is among the objects of this invention: to provide a method of corrugating sheet metal; to provide a method for forming sheet metal with uniform corrugations; to provide a method for forming truly arcuate non-sinusoidal corrugations in a sheet of metal; to provide steps in a corrugating method by which the side walls of the corrugations are formed before the apices themselves; to provide a method for corrugating sheets to insure exact parallelism between adjacent corrugations; and many other objects and advantages as will become more apparent as the description proceeds.

In the accompanying drawings forming part of this specification:

Fig. 1 represents a fragmentary plan of a sheet of metal with cooperating aligning notches formed in the selvage margin, or side edges, Fig. 2 represents a fragmentary diagrammatic edge elevation of a conventionally corrugated sheet of metal, showing the straight or planar side walls which are avoided by the invention herein, Fig. 3 represents a fragmentary diagrammatic edge elevation of a continuously curved non-sinusoidal corrugated sheet according to this invention, Fig. 4 represents a fragmentary enlarged section of the metal sheet and the cooperating die members for securing the initial bend in the sheet, to establish the continuously curved side walls as an initial step, as shown by the full lines from which the sheet springs to the position shown in dotted lines after the die is opened, Fig. 5 represents a perspective of the separated die members of the final apex-forming bending step, Fig. 6 represents diagrammatically the development in completed stages of the completed corrugation according to the invention, Fig. 7 represents diagrammatically the development in intermediate and final stages of the positioning of the side wall of the corrugation relative to the initial flat sheet.

Referring to Fig. 2, there is shown a corrugated sheet 10 comprising partially cylindrical apices 11 to adjacent ones of which the flat side walls 12 are respectively substantially tangential. It will be understood that as usually formed pressure is applied on and normal to the part of the sheet which is to become the apex, and the flat sheet between those points is simply turned about and pulled or stretched between the adjacent apices. It will be obvious that this sinusoidal sheet is lacking in certain characteristics as compared to the continuously curved corrugated sheet shown in Fig. 3. In this figure the corrugations are continuously curved and are intersectingly mutually tangential to each other.

In Fig. 3 the side walls 12 are considered to extend between the parallel vertical lines intersecting the curved sheet, and, as noted, are continuously curved. The parallel vertical lines intersecting the corrugated sheet of Fig. 2 delineate the side walls 12, which are substantially planar.

Referring to Fig. 7, there is disclosed a diagram in which the flat sheet shown at A is given an initial dieing or stamping operation, as in the dies shown in Fig. 4, to impart an initial curvature to the sheet, as shown at A₁ from which, when released, the sheet springs back to substantially the curvature shown at B, marking the completion of the initial bending step and the completion of the side wall 22 of the corrugation. The sheet is then subjected to the final bending operation as in the dies shown in Fig. 5, which engages and bends the flat material between the side walls (22) and a portion of the extremity of the bent side wall, as there is usually an overlap of the material worked in the primary and final bending strips, causing the material in the bent position B to be distorted or swung substantially to the bent position indicated at B'. After release from the dies the bent sheet springs open again to assume the position C, the final completed form in which the curved side wall merges into the curved apex or crest of a corrugation as a continuous arc. While diagram Fig. 7 shows the successive positions and attitudes during the three positions of unstressed and two positions of die distorted stressed and compressed material, it is particularly shown to illustrate the side wall development.

In Fig. 6 the diagram shows the successive final positions of the crest or apex of a corrugation developed from the flat sheet, showing the movement of the side wall as it is both turned and moved laterally into proper tangential relation to the arcuate apex of the corrugation.

It is a factor of importance in this invention that the corrugations are mutually parallel. To insure this the sheet A is provided in the margins with carefully measured and located notches arranged in laterally aligned pairs as 15—15, 16—16, 17—17, 18—18, 20—20, 21—21, etc. Although illustratively shown as spaced across the lateral width of the sheet metal strip, it is also contemplated that they will be longitudinally spaced and aligned. Each pair is to locate and rigidly maintain the crest, apex, or line of symmetry of a corrugation. Notches 16—16 (for instance) will be aligned with the apex of a corrugation presenting its open side in one direction, as vertically upward (Fig. 6), while notches 17—17 will be aligned with the apex of the next adjacent corrugation presenting its open side in the other direction (vertically downward Fig. 6), and with area 22 (Figs. 1 and 6) forming the continuously curved wall between the curved crests of the corrugations.

Referring to Fig. 4, a pair of dies is shown, comprising a bottom male die 23, having a vertical stud 24 received in a recess 25 of the complemental female die 26. It will be understood that the dies 23 and 26 are of sufficient length as to receive the entire length of metal between notches, and that pin or stud 24 and recess 25, have counterparts toward the other end of the die (not shown). The pins engage in the notches of a pair to lock the sheet against movement during dieing operations. Preferably there will be several recesses arranged to mount pins 24, and several cooperating recesses in the dies, so arranged as to be adjustable for various widths or lengths of material to be corrugated.

Die 23 is provided with an elongated plateau-like center section 27 symmetrical relative to the pin 24, curving downwardly on each side by the intersecting mutually tangential curved surfaces 28 and 30, merging into substantially horizontal longitudinally extending lateral margins 31. The female die 26 has a lower surface 32 the complement of that of the male just described, making due allowance (in both dies) for the gauge of metal to be treated.

It is a factor of moment that the radii of arcuate surfaces 28 and 30, and of their complements in female die 26 be calculated and predetermined in accordance with the resilience of the various gauges of sheet metal contemplated to be used, in order to utilize the attendant "spring back" to open the die-impressed curves to the desired finished contour. This change in radius is substantially a linear function of the change in gauge of the metal to be treated.

After the sheet has been disposed on the male die 23 with notches 16 (for instance) on the pins 24, the female die 26 is forced down upon the sheet (in Fig. 4) causing it to assume the form shown in that figure. This subjects the material 22, between laterally spaced notches, to be bent in the reentrant curve shown as a result of vertical pressure on the sheet. Note in Fig. 4 that the portion of the sheet adjacent to notch 16 between the curved portions remains substantially flat. It is this flat portion that in the next step becomes the apex or crest of the corrugation. The initial or preliminary die stamping operation does nothing to the flat portion, the ultimate curved apex, but simply works and contours area 22, as indicated in Fig. 6. Preferably all of the areas 22 between notches are given the preliminary die-pressing before the final step is taken.

In the final processing step the sheet, preferably after completion of all of the initial steps, is positioned on the male die 33. This die has centering studs or locating studs 34, similar to those described in connection with Fig. 4, and is preferably a substantially cylindrical or partially cylindrical member of narrower formation, or of smaller lateral diameter than the internal diameter of the finished apex of the corrugation. This again is predetermined in accordance with the gauge of metal being treated.

Notches 16 are again disposed in embracing relation to the ears or studs 34 so as to center the ultimate crest or apex on the crest of the die. The female semi-cylindrical die 35 engages the upper surface of the relatively flat portions between areas 22, and compresses it about die 33. The contact between the male and female die may comprise an area stopping at, or (and preferably) slightly overlapping the edges of the previously working areas 22, as indicated in dotted lines 36 in Fig. 3. It will be understood that suitable recesses 37 will be provided in the female die to receive pins 34, and the adjustability as to length by repositioning pins 34 will also be obvious.

In Fig. 5, it is assumed that all of the upper curved surfaces containing the crests or apices have been given the final treatment as shown, and the dies have been separated after forming the last complete corrugation, along line 16—16. The fact that the sheet is turned over for alternate corrugations in the final step, and that the compressed position of the final step is preliminary to its release and resilient slight expansion to form the desired substantially continuously curved corrugations desired of the sheet will be understood. It will also be understood that there are no retained stresses of any moment in the sheets, no metal is caused to flow for the result, and the accuracy of the corrugations and strength, visual attractiveness and utility of the sheet will be obvious.

I claim:

1. The method of forming parallel corrugations in a sheet of metal which comprises forming registering pairs of guide means on opposite sides of a sheet with each pair in predetermined laterally spaced relation to adjacent pairs, in using a pair of guide means to hold the sheet against movement while forming side walls of corrugations of the metal between the lines extending between pairs of guide means, then of using a pair of guide means to hold the sheet against movement while forming a corrugation apex between the pre-formed side wall areas.

2. The method of corrugating a hard resilient sheet of metal which comprises the steps of dieing the metal between dies of more acute curvature than is ultimately desired to form curved side wall portions, releasing the metal from the die to permit its expansion to the desired side wall contour, then dieing the metal between the prepared contoured side walls on a curvature more acute than the desired apex contour to form an apex of a corrugation between contoured side walls, then releasing the sheet from the latter die and permitting its expansion substantially to the desired contour of the corrugation.

3. The method of forming corrugated sheets with side walls between corrugations comprising continuously curved mutually tangential surfaces, which comprises dieing out a flat sheet with dies acting normally of the sheet, to form a sheet having the continuously curved mutually tangential surfaces disposed between flat surfaces, and then in dieing the flat portions between the curved surfaces by dies normal of the sheet to shape the flat portions into curved apices merging into the preformed curved side.

4. The method of forming corrugated sheets with continuously curved side walls between curved corrugation apices which consists first in holding the flat sheet and in dieing out a pair of spaced continuously curved side walls formed by two oppositely extending mutually tangential intersecting substantially arcuate portions adjacent a flat portion, and then in holding the sheet and dieing the flat portion to form the curved apex of a corrugation symmetrically between adjacent side walls as a curved continuation of the adjacent arcuate portions only thereof.

5. The method of forming corrugations in a relatively flat sheet of metal which comprises the steps of first forming a complemental pair of spaced curved side walls formed by two oppositely extending mutually tangential intersecting substantially arcuate portions in the flat sheet adjacent to and separated by relatively flat portions of the sheet, and then forming the curved apex of the corrugation from the relatively flat portion between the formed side walls as a substantial continuation of the respective adjacent arcuate portions only of said side walls.

6. The method of forming corrugations in a relatively flat sheet of metal which comprises the steps of first forming simultaneously a complemental pair of spaced curved side walls formed by two oppositely extending mutually tangential intersecting substantially arcuate portions in the flat sheet on opposite sides of a flat portion substantially parallel to the general plane of the sheet, and then forming the curved apex of the corrugation from the relatively flat portion between and as a merging continuation of the adjacent arcuate portions only of the formed side walls.

7. The method of forming corrugations in a relatively flat sheet of metal which comprises the steps of first forming a curved side wall formed by two oppositely extending mutually tangential intersecting substantially arcuate portions between relatively flat portions of the sheet, and then in forming the flat portions on each side of the curved wall into curved apices of corrugations merging into the respective adjacent arcuate portions of curved side wall as continuations thereof.

CARL DE GANAHL.